(12) United States Patent  
Brostmeyer

(10) Patent No.: US 9,810,151 B2  
(45) Date of Patent: Nov. 7, 2017

(54) TURBINE LAST STAGE ROTOR BLADE WITH FORCED DRIVEN COOLING AIR

(71) Applicant: Joseph D Brostmeyer, Jupiter, FL (US)

(72) Inventor: Joseph D Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 170 days.

(21) Appl. No.: 14/512,070

(22) Filed: Oct. 10, 2014

(65) Prior Publication Data

US 2016/0195018 A1 Jul. 7, 2016

Related U.S. Application Data

(60) Provisional application No. 61/869,675, filed on Aug. 24, 2013.

(51) Int. Cl.
*F02C 7/18* (2006.01)
*F01D 5/08* (2006.01)

(52) U.S. Cl.
CPC ............... *F02C 7/18* (2013.01); *F01D 5/082* (2013.01); *F05D 2220/3215* (2013.01); *F05D 2260/20* (2013.01)

(58) Field of Classification Search
CPC .................................. F01D 5/082; F02C 7/18
See application file for complete search history.

(56) References Cited

U.S. PATENT DOCUMENTS

| 4,309,147 A | * | 1/1982 | Koster | F01D 5/08 415/121.2 |
| 5,232,335 A | * | 8/1993 | Narayana | F01D 5/081 415/115 |
| 7,458,766 B2 | * | 12/2008 | Dailey | F01D 5/082 415/1 |

* cited by examiner

*Primary Examiner* — Woody Lee, Jr.
(74) *Attorney, Agent, or Firm* — John Ryznic

(57) ABSTRACT

A turbine of a gas turbine engine with a rotor and a stator forming a rim cavity, where the rotor includes a turbine rotor blade with a cooling air channel opening into the rim cavity, and a centrifugal impeller rotatably connected to the rotor in which the centrifugal impeller discharges pressurized cooling air into the rim cavity to improve the rim cavity seal and to supply pressurized cooling air to the rotor blade cooling air channel.

3 Claims, 2 Drawing Sheets

TURBINE LAST STAGE ROTOR BLADE WITH FORCED DRIVEN COOLING AIR

CROSS-REFERENCE TO RELATED APPLICATIONS

This application claims the benefit to U.S. Provisional Application 61/869,675 filed on Aug. 24, 2013 and entitled TURBINE LAST STAGE ROTOR BLADE WITH FORCED DRIVEN COOLING AIR.

GOVERNMENT LICENSE RIGHTS

None.

BACKGROUND OF THE INVENTION

Field of the Invention

The present invention relates to a gas turbine engine, and more specifically to cooling of the turbine blades in the turbine section of the engine.

Description of the Related Art Including Information Disclosed Under 37 CFR 1.97 and 1.98

Gas turbine engines include stationary vanes and rotating blades in the turbine section that have cooling fluid passages therein. The cooling fluid is usually air, and the supply for cooling air is usually from the compressor of the gas turbine engine. In an industrial gas turbine engine such as the large frame heavy duty engines used for electric power production, the first, second and third stage turbine blades are usually cooled by air supplied from the compressor at various pressures. The cooling air is exhausted to the gas stream from cooling holes in the blades. The first stage blade operates under higher pressures, and therefore requires a cooling fluid supply having such a pressure that the flow can be exhausted into the gas stream. The second and third stage blades also require compressed cooling air in order to exhaust the cooling air into the gas stream. The last stage blade operates under the lowest gas stream pressure, and therefore requires the lowest cooling air pressure of all the stages. Using compressed air supplied from the compressor for the last stage blades waists compressed air and decreases the overall efficiency of the turbine engine.

U.S. Pat. No. 7,677,048 issued to Brostmeyer et al. on Mar. 16, 2010 and entitled TURBINE LAST STAGE BLADE WITH FORCED VORTEX DRIVEN COOLING AIR discloses a turbine with a last stage rotor blade having a cooling air passage and a cover plate having a plurality of blades that is secured over a side of the rotor disk. Rotation of the rotor also rotates the cover plate and the blades within that draw air from ambient and forces the cooling air through the blade cooling air passage for cooling of the blade. This design does not produce enough pressure in the cooling air to provide adequate cooling for the last stage rotor blades of the turbine.

BRIEF SUMMARY OF THE INVENTION

The present invention is directed to an industrial gas turbine engine in which the last stage row of blades is cooled by driving cooling air through the blades, where the cooling air is supplied from the ambient air outside of the turbine and pumped through the blade by a centrifugal force (forced vortex flow) applied to the cooling air flow by the rotation of the blade row, or with the aid of an impeller that is secured to a rotor disk of the last stage rotor and blade assembly that also rotates with the last stage row of blades. The impeller is a centrifugal compressor with an axial inlet and a radial outlet and draws ambient pressure air into the inlet and compressed the air and discharges compressed air into a rim cavity, where the compressed air then flows into a cooling air passage formed within the last stage rotor blade for cooling. The cooling air is then exhausted into the gas stream of the turbine engine

DETAILED DESCRIPTION OF THE INVENTION

Figure 2:
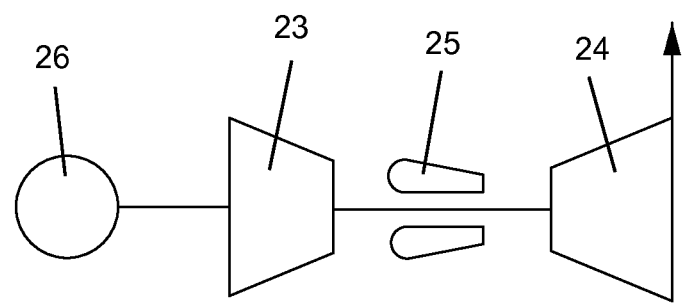
FIG. 2 shows a cross section view of an industrial gas turbine engine driving an electric generator.

A gas turbine engine includes a plurality of stages in the turbine section, each stage including a stationary vane to direct the gas stream onto a stage of rotating blades. It is usual to provide for cooling air passages in the first, second and third stages of the turbine to cool the vanes and blades. The last or fourth stage of the turbine is sometimes not cooled with air passing through the vanes or blades because the gas stream temperature has dropped low enough such that cooling is not needed. FIG. 2 shows an industrial gas turbine engine with a compressor 23 connected to a turbine 24, a combustor 25, and an electric generator 26 connected to the compressor end of the engine.

Figure 1:
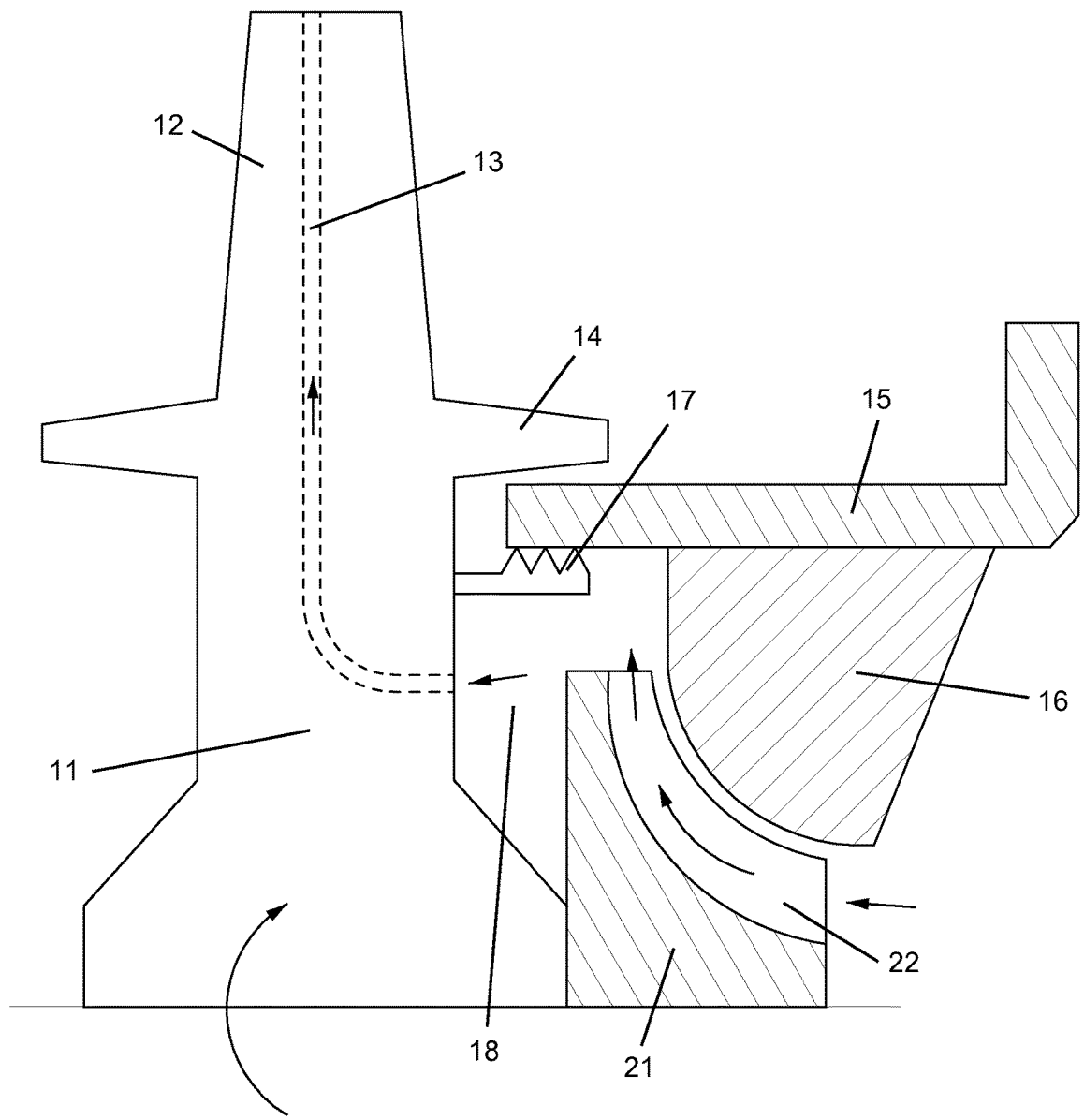
FIG. 1 shows a cross section view of a last stage rotor blade of a turbine with a centrifugal compressor secured to the rotor disk according to the present invention.

The gas turbine engine in FIG. 1 shows the present invention and includes a rotor 11 with a blade 12 extending outward to form a last stage of a turbine of a gas turbine engine, an internal cooling air passage 13 with an inlet opening into a rim cavity 18 and an outlet discharging through a blade tip of the blade, a platform 14, a static casing 15, and labyrinth seal 17 extending from the rotor 11 and forming a seal with the stationary casing 15, an impeller 21 with a blade 22, and a shroud 16 secured to the stationary casing 15 and enclosing the blades 22 of the impeller 21. The impeller 21 is secured to the rotor 11 so that both impeller 21 and rotor 11 rotate together.

The rotor blade 12 includes a cooling air circuit to provide cooling for the blade. The cooling circuit could be one or more straight radial flow channels or a complex cooling circuit with a serpentine flow cooling channel. Rotation of the rotor 11 also rotates the impeller 21 and thus forces cooling air from the ambient atmosphere and into the axial inlet when the air is compressed and discharged out the radial outlets and into the rim cavity 18. The compressed cooling air then enters the internal cooling passage 13 of the rotor blade where the compressed cooling air is forced up through the blade cooling air passage 13 due to rotation of the rotor blade 12. The cooling air can be discharged from the rotor blade at blade tip cooling holes or any other well-known airfoil discharge.

The impeller 21 also pressurizes the cooling air within the rim cavity 18, and thus prevents hot gas from the main stream flow from entering the rim cavity 18. Thus, the pressurized cooling air used for the cooling of the rotor blade 12 is also used to improve the labyrinth seal 17 for the rim cavity 18.

I claim the following:

1. A gas turbine engine comprising:
   a turbine with a rotor and a stator;
   a turbine rotor blade extending from the rotor;
   a centrifugal impeller rotatably connected to the rotor;
   a rim cavity formed between the rotor and the stator;
   a seal formed between the rotor and the stator to form a seal between the rim cavity and a hot gas path through the turbine;
   a cooling air channel formed in the rotor and the turbine rotor blade with an opening into the rim cavity;
   the centrifugal impeller located on the rotor such that rotation of the rotor and centrifugal impeller discharges pressurized cooling air into the rim cavity and then through the cooling air channel formed in the rotor and turbine rotor blade; and,
   the centrifugal impeller having an axial inlet and a radial outlet.

2. A gas turbine engine comprising:
   a turbine with a rotor and a stator;
   a turbine rotor blade extending from the rotor;
   a centrifugal impeller rotatably connected to the rotor;
   a rim cavity formed between the rotor and the stator;
   a labyrinth seal formed between the rotor and the stator to form a seal between the rim cavity and a hot gas path through the turbine;
   a cooling air channel formed in the rotor and the turbine rotor blade with an opening into the rim cavity; and,
   the centrifugal impeller located on the rotor such that rotation of the rotor and centrifugal impeller discharges pressurized cooling air into the rim cavity and then through the cooling air channel formed in the rotor and turbine rotor blade.

3. A gas turbine engine comprising:
   a turbine with a rotor and a stator;
   a turbine rotor blade extending from the rotor;
   a centrifugal impeller rotatably connected to the rotor;
   a rim cavity formed between the rotor and the stator;
   a seal formed between the rotor and the stator to form a seal between the rim cavity and a hot gas path through the turbine;
   a cooling air channel formed in the rotor and the turbine rotor blade with an opening into the rim cavity;
   the centrifugal impeller located on the rotor such that rotation of the rotor and centrifugal impeller discharges pressurized cooling air into the rim cavity and then through the cooling air channel formed in the rotor and turbine rotor blade; and,
   a shroud secured to the stationary casing and enclosing blades of the centrifugal impeller.

\* \* \* \* \*